US012169255B2

(12) United States Patent
Miguel Sánchez et al.

(10) Patent No.: US 12,169,255 B2
(45) Date of Patent: Dec. 17, 2024

(54) TIME-OF-FLIGHT MEASUREMENT WITH BACKGROUND LIGHT CORRECTION

(71) Applicant: ams Sensors Singapore Pte. Ltd., Singapore (SG)

(72) Inventors: Javier Miguel Sánchez, Zurich (CH); Miguel Bruno Vaello Paños, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 947 days.

(21) Appl. No.: 17/276,657

(22) PCT Filed: Sep. 13, 2019

(86) PCT No.: PCT/SG2019/050459
§ 371 (c)(1),
(2) Date: Mar. 16, 2021

(87) PCT Pub. No.: WO2020/060484
PCT Pub. Date: Mar. 26, 2020

(65) Prior Publication Data
US 2021/0270946 A1 Sep. 2, 2021

Related U.S. Application Data

(60) Provisional application No. 62/734,592, filed on Sep. 21, 2018.

(51) Int. Cl.
*G01S 7/48* (2006.01)
*G01S 7/4915* (2020.01)
*G01S 7/497* (2006.01)

(52) U.S. Cl.
CPC ............ *G01S 7/497* (2013.01); *G01S 7/4915* (2013.01)

(58) Field of Classification Search
None
See application file for complete search history.

(56) References Cited

U.S. PATENT DOCUMENTS

2013/0208091 A1  8/2013  Yahav et al.

FOREIGN PATENT DOCUMENTS

| DE | 102014205585 A1 | 10/2014 |
| JP | 2013246087 A | 12/2013 |
| WO | 2020060484 A1 | 3/2020 |

OTHER PUBLICATIONS

International Patent Application No. PCT/SG2019/050459, "International Search Report", mailed Nov. 25, 2019, 3 pages.
International Patent Application No. PCT/SG2019/050459, "Written Opinion", mailed Nov. 25, 2019, 6 pages.

*Primary Examiner* — Hovhannes Baghdasaryan
(74) *Attorney, Agent, or Firm* — VIERING, JENTSCHURA & PARTNER mbB

(57) ABSTRACT

In an example implementation, a first light measurement is obtained using a photodetector of a sensor module. The first light measurement corresponds, at least in part, to ambient light in an environment of the sensor module. Modulated light is generated using a light source of the sensor module, and a second light measurement is obtained using the photodetector of the sensor module. The second light measurement corresponds, at least in part, to modulated light reflected from an object toward the photodetector. A distance between the sensor module and the object is estimated, using an electronic control device, based on the first measurement, the second light measurement, and the modulated light.

10 Claims, 10 Drawing Sheets

TIME-OF-FLIGHT MEASUREMENT WITH BACKGROUND LIGHT CORRECTION

CROSS-REFERENCE TO RELATED APPLICATIONS

This application is a 371 U.S. National Phase of PCT International Patent Application No. PCT/SG2019/050459, filed on Sep. 13, 2019, which claims benefit and priority to U.S. provisional patent application No. 62/734,592, filed on Sep. 21, 2018; the disclosures of which are each incorporated by reference herein in their entirety for all purposes.

TECHNICAL FIELD

The disclosure relates to time-of-flight sensors.

BACKGROUND

A time-of-flight sensor is a range imaging system that resolves distances based on the known speed of light. As an example, a "direct" time-of-flight sensor can emit a pulse of light toward an object, and detect light that reflects from the object and returns to the sensor. The distance between the object and the sensor can be determined based on the length of time between the emission of light and the return of light to the sensor (e.g., the "time of flight" of the light from the sensor to the object, and back to the sensor).

As another example, an "indirect" time-of-flight sensor can emit modulated light toward the object, and detect modulated light that reflects from the object and returns to the sensor. The distance between the object and the sensor can be determined based on a phase difference between the emitted modulated light and the returning modulated light.

Time-of-flight sensors can be used in a variety of different applications to detect the presence and position of objects with respect to the sensor. As examples, time-of-flight sensors can be used for in vehicular sensing systems, robotics systems, and/or mobile computing devices (e.g., smartphones, tablet computers, wearable devices, etc.).

SUMMARY

The presence of ambient or background light can negatively affect the accuracy and reliability of a time-of-flight sensor's measurements. As an example, the sun, general lighting devices, display devices, and/or other light sources can emit spurious non-modulated light and/or off-modulation light. When the sensor obtains light measurements in the presence of this background light, the sensor may detect not only the light that is emitted by the sensor and reflected from the object, but also the background light. As a result of these spurious contributions, the accuracy and/or the reliability of the sensor's distance determination may be negatively affected.

The accuracy and/or reliability of a time-of-flight sensor can be enhanced by accounting for the presence of background light during a sensor's operation. In an example implementation, a time-of-flight sensor is operable to obtain a background signal corresponding to the characteristics of the background light alone. Further, the time-of-flight sensor can obtain a sample signal in accordance with a time-of-flight measurement technique. The sample signal includes contributions from both the modulated light that is emitted by the sensor and reflected from the object, as well as the background light. However, the sensor is operable to perform a background correction technique by subtracting the contribution of the background signal from the sample signal. Subsequently, the modified sample signal can be used to determine the distance between the sensor and the object.

The implementations described herein can provide a variety of benefits. In some implementations, a time-of-flight sensor can obtain measurements that are more accurate and/or reliable in a variety of different conditions (e.g., compared to measurements conducted without a background correction technique). This enables the sensor to be used across a more diverse range of applications, environments, times of day, etc. Further, measurements from the time-of-flight sensor be used by other devices (e.g., vehicles, robots, mobile devices, etc.) to ascertain their surroundings more accurately, and more effectively adapt their operations based on this information.

In an aspect, a method includes obtaining a first light measurement using a photodetector of a sensor module. The first light measurement corresponds, at least in part, to ambient light in an environment of the sensor module. The method also includes generating modulated light using a light source of the sensor module, and obtaining a second light measurement using the photodetector of the sensor module. The second light measurement corresponds, at least in part, to modulated light reflected from an object toward the photodetector. The method also includes estimating, using an electronic control device, a distance between the sensor module and the object based on the first measurement, the second light measurement, and the modulated light.

Implementations of this aspect can include one or more of the following features.

In some implementations, estimating the distance between the sensor module and the object includes determining a first phase vector corresponding to the first light measurement, determining a second phase vector corresponding to the second light measurement, and determining a third phase vector corresponding to the modulated light.

In some implementations, estimating the distance between the sensor module and the object includes subtracting the first phase vector from the second phase vector to obtain a fourth phase vector.

In some implementations, estimating the distance between the sensor module and the object includes determining a difference in phase between the fourth phase vector and the third phase vector.

In some implementations, estimating the distance between the sensor module and the object includes estimating the distance between the sensor module and the object based on the difference in phase between the fourth phase vector and the third phase vector In some implementations, the distance between the sensor module and the object is approximately proportional of the difference in phase between the fourth phase vector and the third phase vector.

In some implementations, the method further includes determining, based on the first light measurement, an intensity of the ambient light, determining that the intensity of the ambient light is greater than a threshold intensity level, and responsive to determining that the intensity of the ambient light is greater than the threshold intensity level, presenting a notification to a user of the sensor module.

In some implementations, the method further includes transmitting an indication of the distance between the sensor module and the object to one or more processors of a host device.

In some implementations, the method further includes modifying an operation of host device based on the indication of the distance between the sensor module and the object.

In some implementations, the ambient light includes sunlight.

In some implementations, the ambient light includes light emitted by one or more artificial light sources in an environment of the sensor module.

In another aspect, a system includes a sensor module having a photodetector and a light source, and an electronic control device. The sensor module is operable to obtain a first light measurement using the photodetector. The first light measurement corresponds, at least in part, to ambient light in an environment of the sensor module. The sensor module is also operable to generate modulated light using the light source, and obtain a second light measurement using the photodetector. The second light measurement corresponds, at least in part, to modulated light reflected from an object toward the photodetector. The electronic control device is operable to estimate a distance between the sensor module and the object based on the first measurement, the second light measurement, and the modulated light.

Implementations of this aspect can include one or more of the following features.

In some implementations, estimating the distance between the sensor module and the object includes determining a first phase vector corresponding to the first light measurement, determining a second phase vector corresponding to the second light measurement, and determining a third phase vector corresponding to the modulated light.

In some implementations, estimating the distance between the sensor module and the object includes subtracting the first phase vector from the second phase vector to obtain a fourth phase vector.

In some implementations, estimating the distance between the sensor module and the object includes determining a difference in phase between the fourth phase vector and the third phase vector.

In some implementations, estimating the distance between the sensor module and the object includes estimating the distance between the sensor module and the object based on the difference in phase between the fourth phase vector and the third phase vector In some implementations, the distance between the sensor module and the object is approximately proportional of the difference in phase between the fourth phase vector and the third phase vector.

In some implementations, the sensor module is operable to determine, based on the first light measurement, an intensity of the ambient light, determine that the intensity of the ambient light is greater than a threshold intensity level, and responsive to determining that the intensity of the ambient light is greater than the threshold intensity level, present a notification to a user of the sensor module using a display device.

In some implementations, the sensor module is operable to transmit an indication of the distance between the sensor module and the object to one or more processors of the system.

In some implementations, the sensor module is operable to modify an operation of system based on the indication of the distance between the sensor module and the object.

In some implementations, the ambient light includes sunlight.

In some implementations, the ambient light includes light emitted by one or more artificial light sources in an environment of the sensor module.

In some implementations, the sensor module includes a time of flight sensor module.

In some implementations, the light source includes a laser emitter.

In some implementations, the photodetector includes a photodiode.

The details of one or more implementations are set forth in the accompanying drawings and the description below. Other aspects, features and advantages will be apparent from the description and drawings, and from the claims.

DETAILED DESCRIPTION

The presence of ambient or background light can negatively affect the accuracy and reliability of a time-of-flight sensor's measurements. As an example, the sun, general lighting devices (e.g., house lights, office lights, etc.), display devices (e.g., televisions, computer monitors, display screens, etc.) and/or other light sources can emit spurious non-modulated light and/or off-modulation light (e.g., light having a modulation pattern different from that of the light emitted by the sensor). When the sensor obtains light measurements in the presence of this background light, the sensor may detect not only the light that is emitted by the sensor and reflected from the object, but also the background light. As a result of these spurious contributions, the accuracy and/or the reliability of the sensor's distance determination may be negatively affected.

The accuracy and/or reliability of a time-of-flight sensor can be enhanced by accounting for the presence of background light during a sensor's operation. In an example implementation, a time-of-flight sensor is operable to obtain a background signal corresponding to the characteristics of the background light alone (e.g., by measuring the intensity and/or the phase of the ambient light while the sensor's light emitter is turned off). Further, the time-of-flight sensor can obtain a sample signal in accordance with a time-of-flight measurement technique (e.g., by generating modulated light using its light emitter, directing the modulated light to an object, and obtaining one or more intensity and/or phase measurements of light). The sample signal includes contributions from both the modulated light that is emitted by the sensor and reflected from the object, as well as the background light. However, the sensor is operable to perform a background correction technique by subtracting the contribution of the background signal from the sample signal. Subsequently, the modified sample signal can be used to determine the distance between the sensor and the object.

Figure 1:
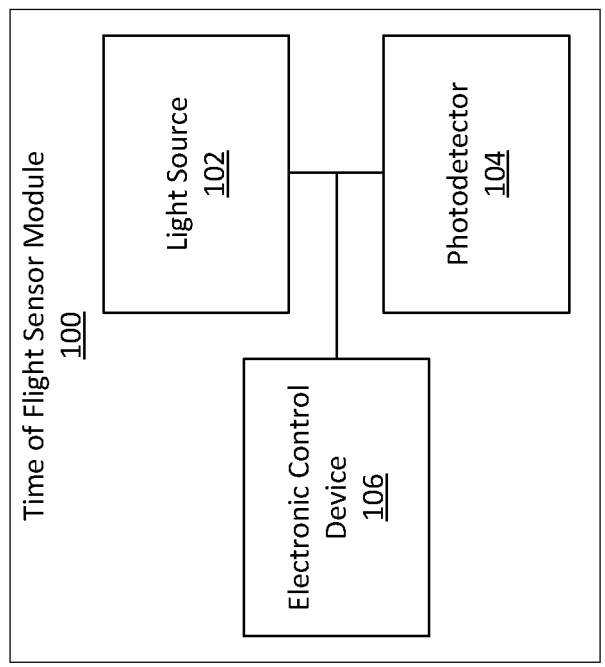
FIG. 1 is a schematic diagram of an example time-of-flight sensor module.

An example time-of-flight sensor module 100 is shown in FIG. 1. The sensor module 100 includes a light source 102, a photodetector 104, and an electronic control device 106. In an example usage of the sensor module 100, the light source 102 generates lights, which is emitted toward a subject (e.g., an object in proximity to the sensor module 100). The photodetector 104 measures light that reflects from the subject and returns to the sensor module 100. The electronic control device 106 determines information regarding the subject (e.g., the distance between the object and the sensor module 100) based on information regarding the emitted light and the returning light.

The light source 102 is a component operable to generate light and emit light toward the subject. In some cases, the light source 102 is operable to emit one or more pulses of light (e.g., one, three, three, or more pulses). These pulses can be emitted continuously, periodically, intermittently, or according to some other pattern. In some cases, the light source 102 is operable to emit modulated light. For instance, the light source 102 can obtain a periodic waveform (e.g., a carrier signal), and vary one or more properties of the waveform with a modulating signal containing information to be transmitted. In some cases, the modulated signal is a pulse-modulated signal or a continuous-wave modulated signal. In some cases, the light source 102 is operable to generate light having particular spectral characteristics (e.g., generate light signals having a particular wavelength or range of wavelengths). The light source 102 can include one or more light emitting elements. As an example, the light source 102 can include one or more light emitting diodes (LEDs), vertical cavity surface emitting lasers (VCSELs), organic light emitting diodes (OLEDs), or other devices that selectively generate light.

The electronic control device 106 can control the operation of the light source 102. For example, the electronic control device 106 can be communicatively coupled to the light source 102, and selectively turn on or off the light source 102 (e.g., to generate light during selected periods of time, such as during a measurement operation). As another example, the electronic control device 106 can specify the characteristics of the generated light (e.g., to generate light according to a specific pattern, spectral composition, etc.). Further, the electronic control device 106 can obtain information describing the characteristics of the emitted light (e.g., the time at which the light is emitted, the intensity of the emitted light, the spectral composition of the emitted light, the phase of the emitted light, etc.).

The photodetector 104 is a component operable to measure light incident upon the photodetector 104 (e.g., light emitted from the light source 102, and reflected from the object back toward the photodetector 104). The photodetector 104 can measure various characteristics of light. In some cases, the photodetector 104 measures the intensity of light and/or the spectral characteristics of the light. In some cases, the photodetector 104 determines the time at which the light was detected. In some cases, the photodetector 104 determines the transient properties of the light, such as a phase of the light. In some cases, the photodetector 104 is operable to measure light according to one or more discrete points in time. In some cases, the photodetector 104 is operable to measure light continuously, periodically, intermittently, or according to some other pattern.

The electronic control device 106 also can control the operation of the photodetector 104. For example, the electronic control device 106 can be communicatively coupled to the photodetector 104, and selectively turn on or off the photodetector 104 (e.g., to measure light during selected periods of time, such as during a measurement operation). Further, the electronic control device 106 can obtain information describing the characteristics of the measured light (e.g., the time at which the light is measured, the intensity of the measured light, the spectral composition of the measured light, the phase of the measured light, etc.).

Figure 2:
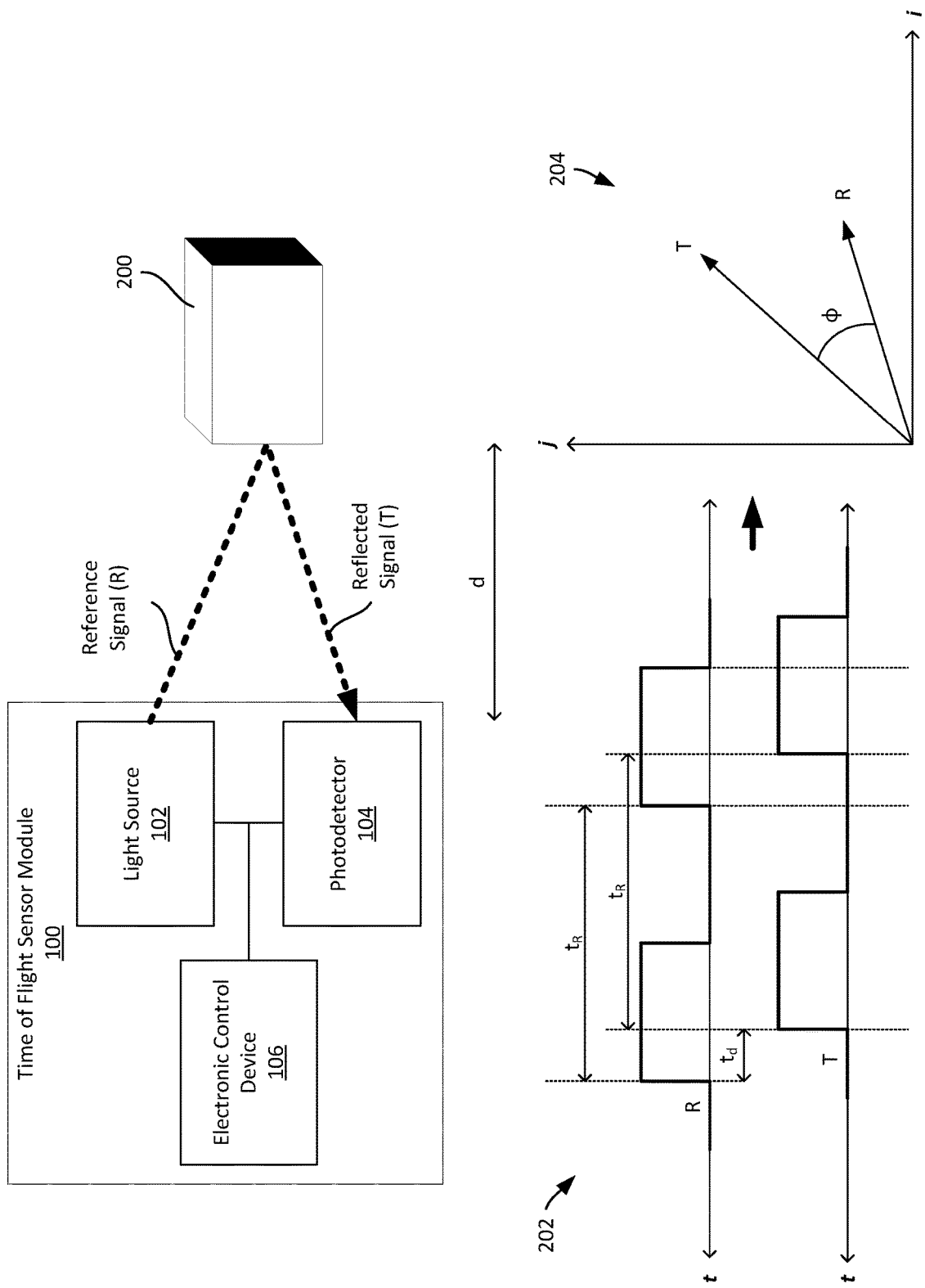
FIG. 2 is a diagram showing an example usage of a time-of-flight sensor module.

The electronic control device 106 can determine information regarding the subject (e.g., the distance between the object and the sensor module 100) based on information regarding the emitted light and the returning light. To illustrate, FIG. 2, shows an example usage of the sensor module 100. In this example, the sensor module 100 is in proximity to an object 200.

The light source 102 is operable to generate light in the form of a reference signal R (e.g., based on instructions from the electronic control device 106), which is directed toward the object 200. At least some of the emitted light reflects from the object 200 and returns to the photodetector 104 in the form of a reflected signal T. The photodetector 104 measures the reflected signal T, and transmits information regarding the measurements to the electronic control device 106.

The electronic control device 106 is operable to determine the distance d between the object 200 and the sensor module 100 based on information regarding the reference signal R and the reflected signal T. As an example, FIG. 2 shows a time-domain plot 202 of the reference signal R and the reflected signal T. The reference signal R is a periodic signal (e.g., a modulated signal) having a period $t_r$. The reflected signal T is also a periodic signal having a period $t_r$. However, the phase of the reflected signal T differs from the phase of the reference signal R, as indicated by a time shift $t_d$ between the reflected signal T and the reference signal R.

This difference in phase can be expressed using phase vectors (or "phasors") on a complex number plane. As an example, FIG. 2 shows a complex plot 204 depicting the reference signal R and the reflected signal T as phase vectors on the complex plane (e.g., where the i-axis corresponds to the real number component of a phase vector, and the j-axis corresponds to the imaginary number component of a phase vector). The magnitude of each phase vector represents the intensity of the corresponding signal (e.g., the intensity of light), while the angle between two phase vectors represents a difference in phase between the phase vectors. In this example, the difference in phase between the reference signal R and the reflected signal T is ϕ.

The difference in phase ϕ varies according to the distance d. Accordingly, the distance d can be estimated by determining the difference in phase ϕ based on a known relationship between them. In some cases, the distance d is approximately proportional to the phase ϕ (e.g., the distance d can be estimated using the equation d≈k*ϕ, where k is an empirically or theoretically determined constant). In some cases, the distance d is estimated using the equation:

$$d = \frac{c}{2f} \cdot \frac{\phi}{2\pi},$$

where f is the modulation frequency, and c is the speed of light.

In the example shown in FIG. 2, the only source of light is the light source 102. Accordingly, the photodetector 104 only measures light that has been emitted by the light source 102 and reflected by the object 200. However, in practice, the sensor module 100 may be operated in a variety of different conditions, including in the presence of background light (e.g., spurious non-modulated light and/or off-modulation light). This background light can negatively affect the accuracy and reliability of a time-of-flight sensor's measurements. For example, when the photodetector 104 obtains light measurements in the presence of this background light, the photodetector 104 detects not only the light that is emitted by the sensor and reflected from the object (e.g., the reflected signal T), but also the background light. As a result of these spurious contributions, the accuracy and/or the reliability of the sensor's distance determination may be negatively affected.

Figure 3:
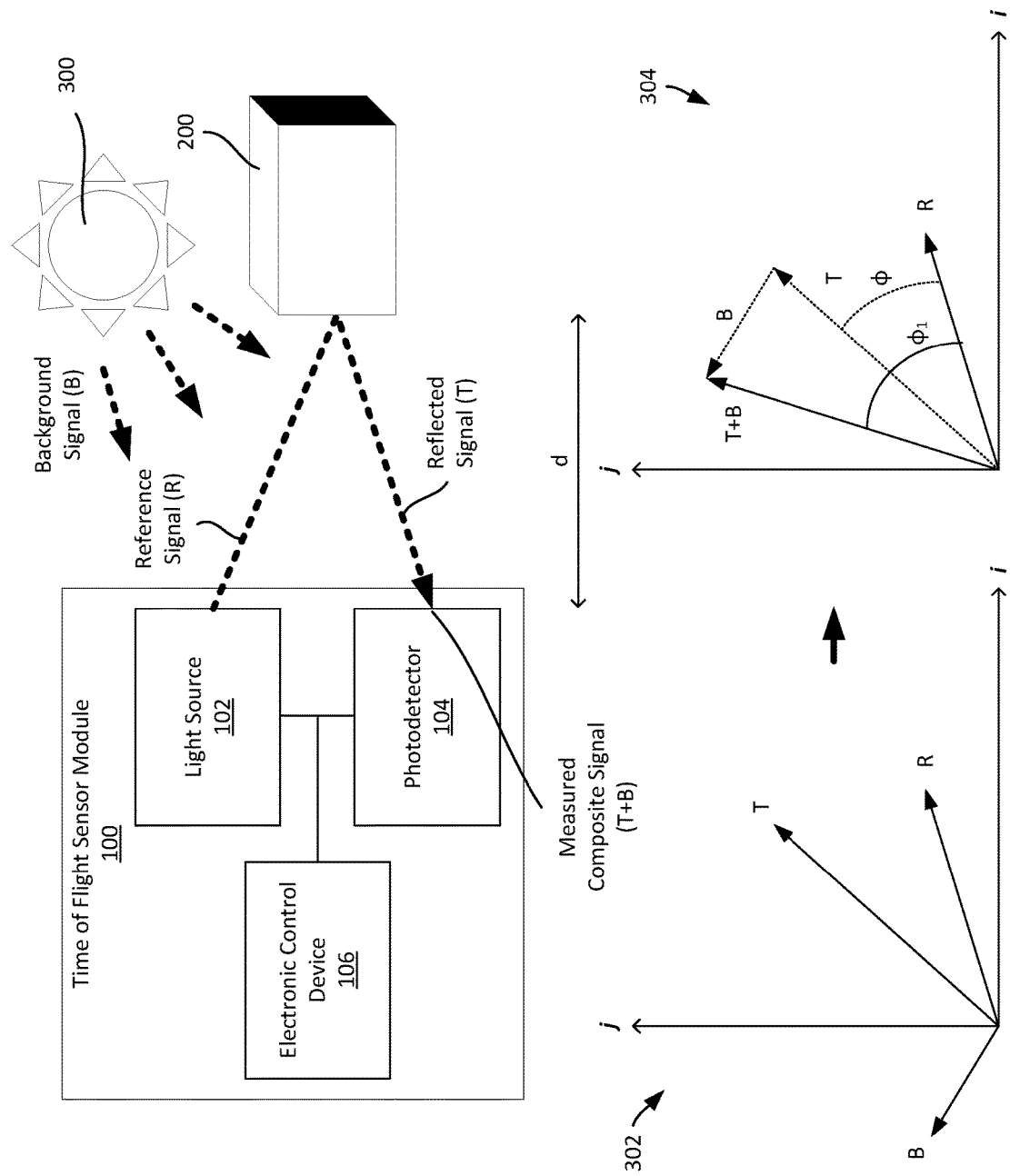
FIG. 3 is a diagram showing an example usage of a time-of-flight sensor module in the presence of a background light source.

To illustrate, FIG. 3, shows an example usage of the sensor module 100. In this example, the sensor module 100 is in proximity to an object 200 and a background light source 300. The background light source 300 can be any source of light other than the light source 102. As examples, the background light source 300 can include the sun, general lighting devices (e.g., house lights, office lights, etc.), display devices (e.g., televisions, computer monitors, etc.) and/or other light sources. Further, although a single background light source 300 is shown in FIG. 3, it is understood that the sensor module 100 can be operated in the presence of any number of background light sources (e.g., one, two, three, or more).

In a similar manner as described with respect to FIG. 2, the light source 102 generates light in the form of a reference signal R (e.g., based on instructions from the electronic control device 106), which is emitted toward the object 200. At least some of the emitted light reflects from the object 200 and returns to the photodetector 104 in the form of a reflected signal T.

However, the background light source 300 also emits light. Further, at least some of the light emitted by the background light source 300 is incident upon the photodetector 104 in the form of a background signal B. Accordingly, when the photodetector 104 conducts a measurement, it is measuring a composite signal with contributions from both reflected signal T and the background signal B (e.g., a composite signal T+B), rather than the reflected signal T or the background signal B alone.

FIG. 3 shows a complex plot 302 indicating the reference signal R, the reflected signal T, and the background signal B on the complex plane. In a similar manner as described with respect to FIG. 2, the magnitude of each phase vector represents the intensity of the corresponding signal (e.g., the intensity of light), while the angle between two phase vectors represents a difference in phase between the phase vectors. In the complex plot 302, each of the phase vectors are shown individually. However, as discussed above, when the photodetector 104 conducts a measurement, it is measuring a composite signal with contributions from both reflected signal T and the background signal B (e.g., a composite signal T+B), rather than the reflected signal T or the background signal B alone. Accordingly, the phase vector representing the photodetector's measurement is in actuality the sum of the phase vector of the background signal B and the phase vector of the reflected signal T (e.g., a composite phase vector T+B), and the phase difference $\phi_1$ between the between the reference signal R and the photodetector's measurement is in actuality the phase difference between the reference signal R and the composite signal T+B (e.g., as shown in plot 304). As the phase difference the phase difference $\phi_1$ does not reflect the actual difference in phase $\phi$ between the reference signal R and the reflected signal T, distance estimates based on the phase difference $\phi_1$ may be less accurate (e.g., compared to an estimated based on the actual phase difference $\phi$). Further, in view of the background light's contribution to the measured signals, distance estimates may vary as a result of variations in the characteristics of the background light. Accordingly, the output of the sensor module 100 may be less reliable, depending on variations in the measurement conditions.

The accuracy and/or reliability of the sensor module 100 can be enhanced by accounting for the presence of the background light during the sensor module's operation. An example background correction technique is shown in FIGS. 4A-4D.

Figure 4A:
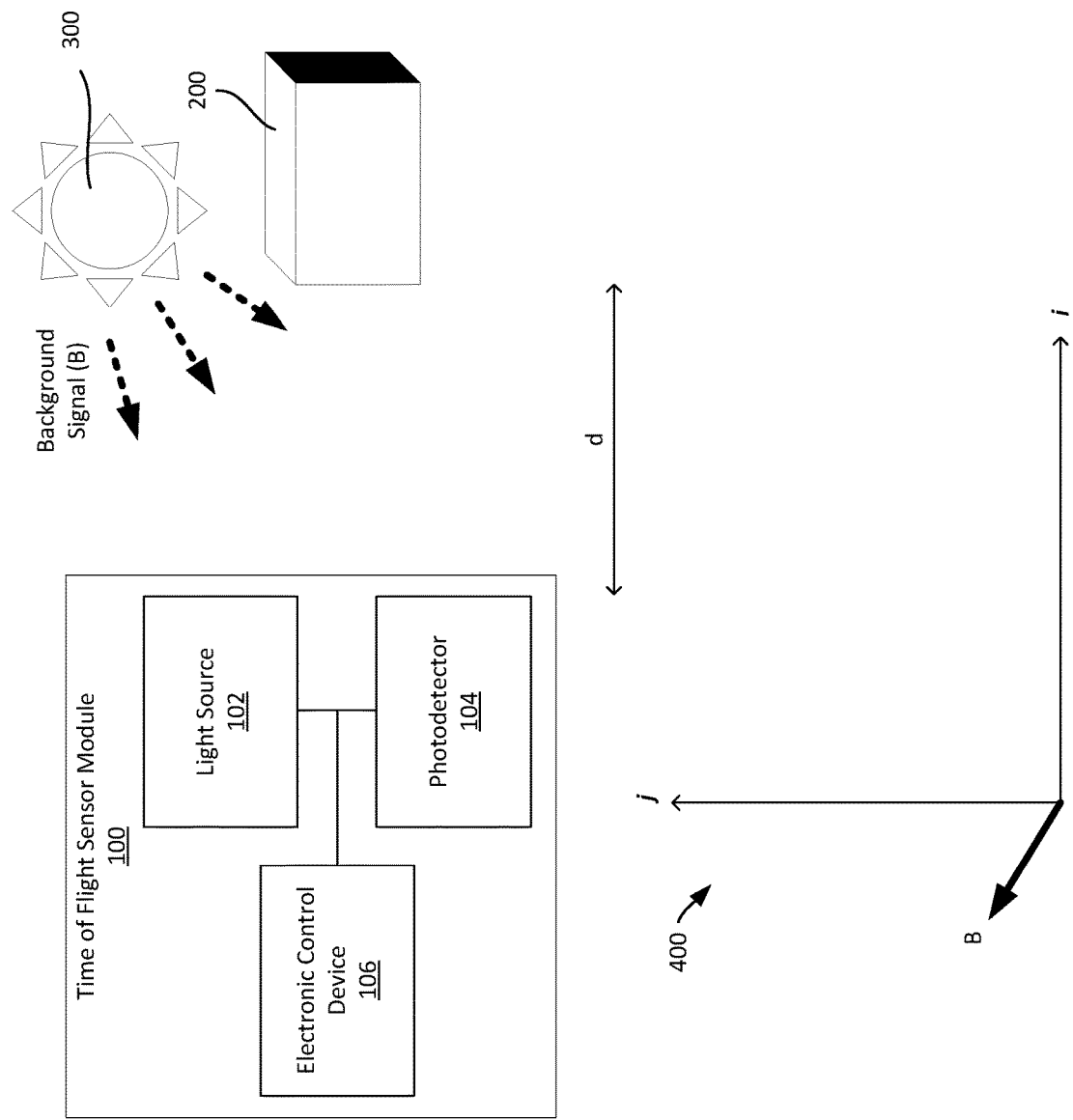
FIGS. 4A-4D are diagram showing another example usage of a time-of-flight sensor module in the presence of a background light source.

As shown in FIG. 4A, the sensor module 100 obtains a background measurement using the photodetector 104 while the light source 102 is not emitting any light (e.g., while the light source 102 is switched off or blocked). During this time, the only light incident upon the photodetector 104 is background light emitted by the background light source 300 (e.g., in the form of a background signal B). As shown in the complex plot 400, the sensor module 100 determines a phase vector B representing the measured background signal (e.g., using the electronic control device 106).

Figure 4B:
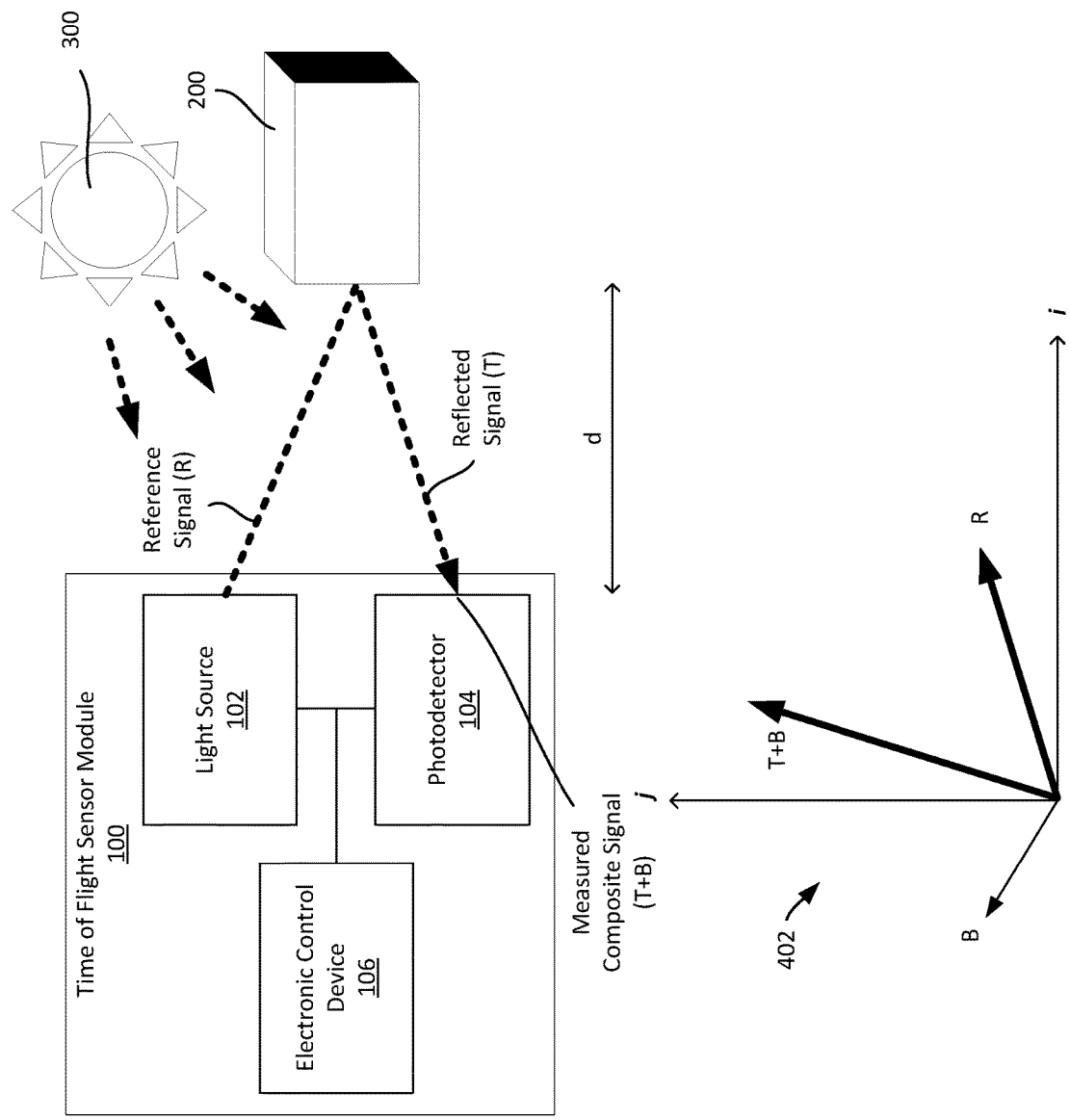

As shown in FIG. 4B, the sensor module 100 also obtains a sample measurement. This can be performed in a similar manner as discussed with respect to FIG. 3. For example, the light source 102 generates light in the form of a reference signal R (e.g., based on instructions from the electronic control device 106), which is emitted toward the object 200. At least some of the emitted light reflects from the object 200 and returns to the photodetector 104 in the form of a reflected signal T. As the background light source 300 continues emits light, at least some of the light emitted by the background light source 300 continues to be incident upon the photodetector 104 in the form of a background signal B. Accordingly, when the photodetector 104 conducts a measurement, it is measuring a composite signal with contributions from both reflected signal T and the background signal B (e.g., a composite signal T+B), rather than the reflected signal T or the background signal B alone. As shown in the complex plot 402, the sensor module 100 determines a phase vector T+B representing the measured composite signal and a phase vector R representing the reference signal (e.g., using the electronic control device 106).

Figure 4C:
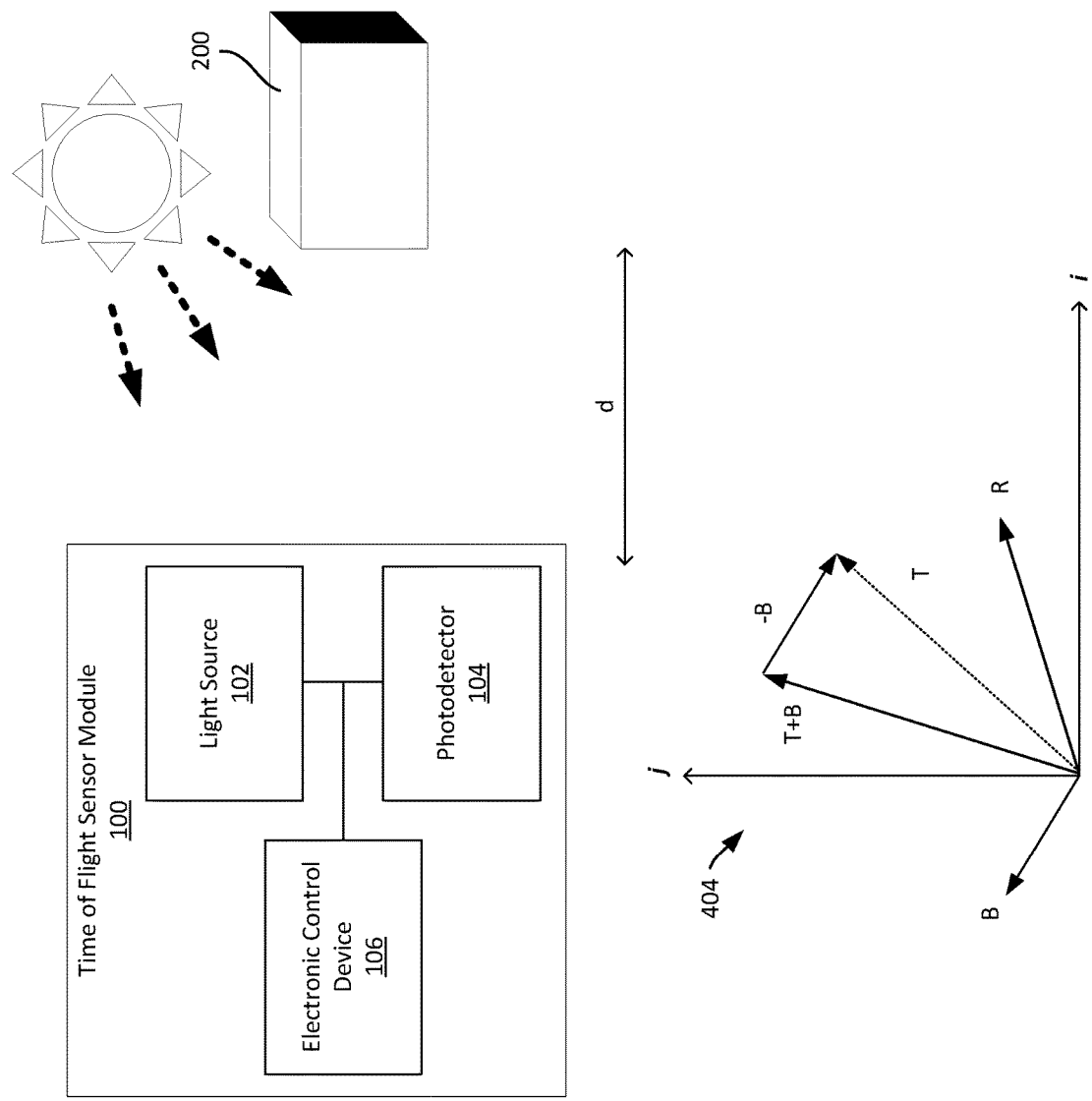
Figure 4D:
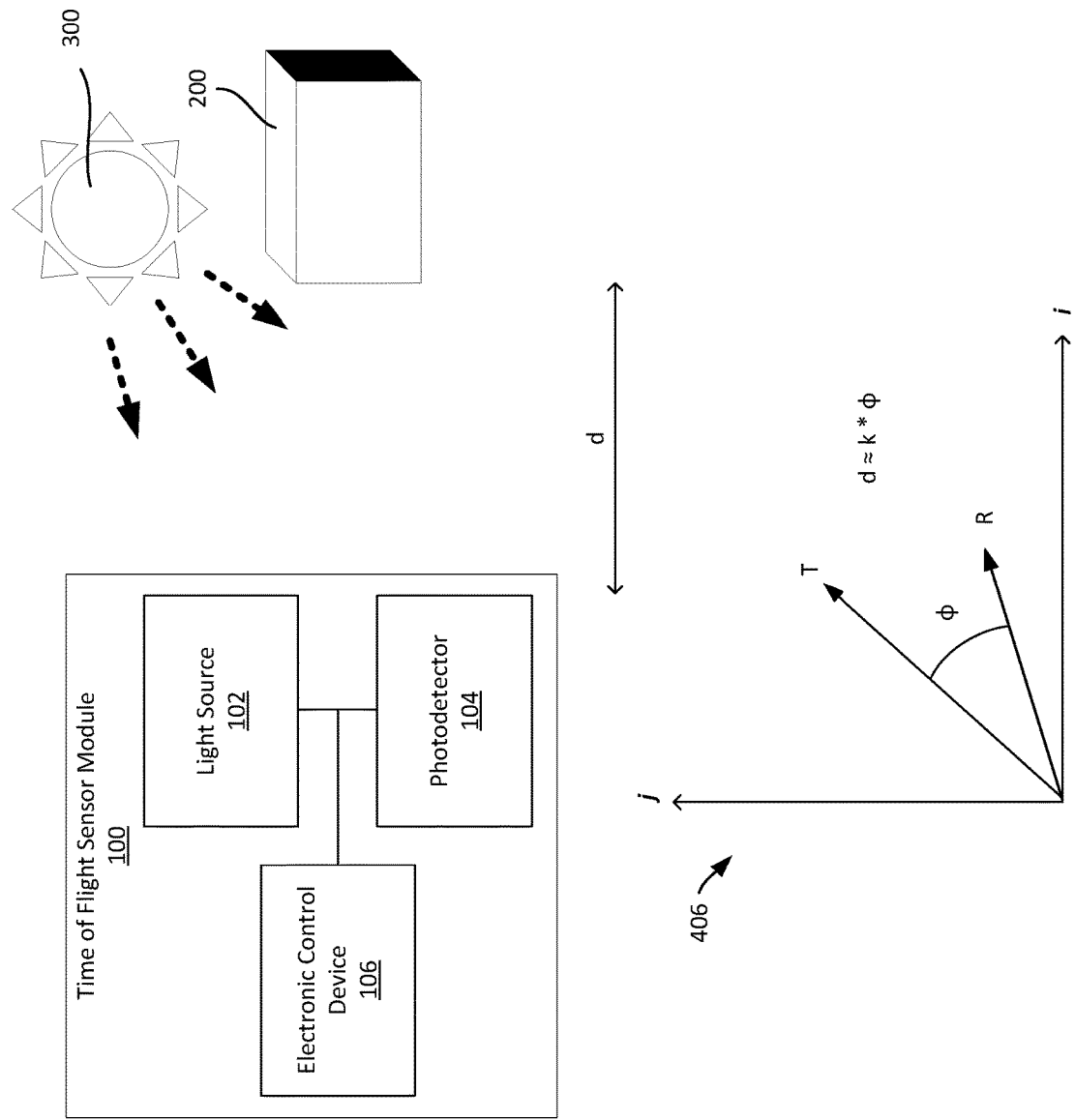

As shown in the complex plot 404 in FIG. 4C, the sensor module 100 determines a phase vector phase vector T representing the reflected signal alone by subtracting the phase vector B from the composite phase vector T+B (e.g., using the electronic control device 106). The phase vector T no longer contains contributions from the background light (e.g., intensity and/or phase contributions), and can be used to estimate the distance d between the object 200 and the sensor module 100. For example, as shown in complex plot 406 in FIG. 4D, the distance d can be estimated by determining the difference in phase $\phi$ based on a known relationship between them (e.g., using the equations $d \approx k^* \phi$ and/or $$d = \frac{c}{2f} \cdot \frac{\phi}{2\pi}).$$

In some cases, the background measurement process (e.g., as shown and described with respect to FIG. 4A) is performed prior to the sample measurement process (e.g., as shown and described with respect to FIG. 4B). As an example, upon receiving an instruction to perform a distance estimation, the sensor module 100 initially can conduct a background measurement, then subsequently perform a sample measurement. As another example, the sensor module 100 can conduct a background measurement when it first is initialized (e.g., turned on), then subsequently perform a sample measurement upon receiving an instruction to perform a distance estimation.

In some cases, the background measurement process is performed after the sample measurement process. As an example, upon receiving an instruction to perform a distance estimation, the sensor module 100 initially can perform a sample measurement, then subsequently perform a background measurement.

In some cases, the sensor module 100 conducts a single background measurement, and uses the same background measurement to remove background light contributions from multiple different sample measurements. As an example, the sensor module 100 can conduct a single background measurement to determine a phase vector B. The sensor module 100 can subsequently obtain multiple sample measurements to determine multiple different composite phase vectors T+B, and subtract the phase vector B from each of the composite phase vectors T+B to compensate for the contributions of the background light. In some cases, information regarding the background measurement (e.g., the phase vector B) is stored by the electronic control device 106, and selectively retrieved by the electronic control device 106 when a sample measurement is made. This can be useful, for example, in reducing the amount of time needed to perform each distance estimation.

In some cases, the sensor module 100 also determines when a distance estimation may be potentially unreliable. For instance, in some cases, background light having a particularly high intensity could negatively affect the operation of the sensor module 100 (e.g., by interfering with the photodetector's ability to detect reflected light from an object). The sensor module 100 can determine the intensity of the background light (e.g., during the background light measurement process), and compare the measured intensity to a threshold intensity value. If the measured intensity is greater than the threshold intensity value, the sensor module 100 can generate an indication that a distance estimation conducted in the presence of the background light is potentially unreliable or inaccurate. As an example, the sensor module 100 can record the distance estimation alongside a message indicating that the distance estimation was conducted in the presence of intense background light. As another example, the sensor module 100 can instruct a device to present an alert to a user of the sensor module 100 indicating that the distance estimation was conducted in the presence of intense background light. An alert might be an audible signal or a message on a display screen. In some cases, the threshold intensity value is empirically determined (e.g., based on experimental tests comparing the accuracy of measurements to the intensity of background light).

Although example phase vectors are depicted in the drawings (e.g., in FIGS. 2, 3, and 4A-4D), in practice, the characteristics of each phase vector (e.g., the magnitudes and/or phases) and the relationship between them can differ, depending on the implementation. As an example, in practice, phase vector B corresponding to the background signal can have a smaller phase (e.g., closer to the i axis) than shown in the drawings.

Figure 5:
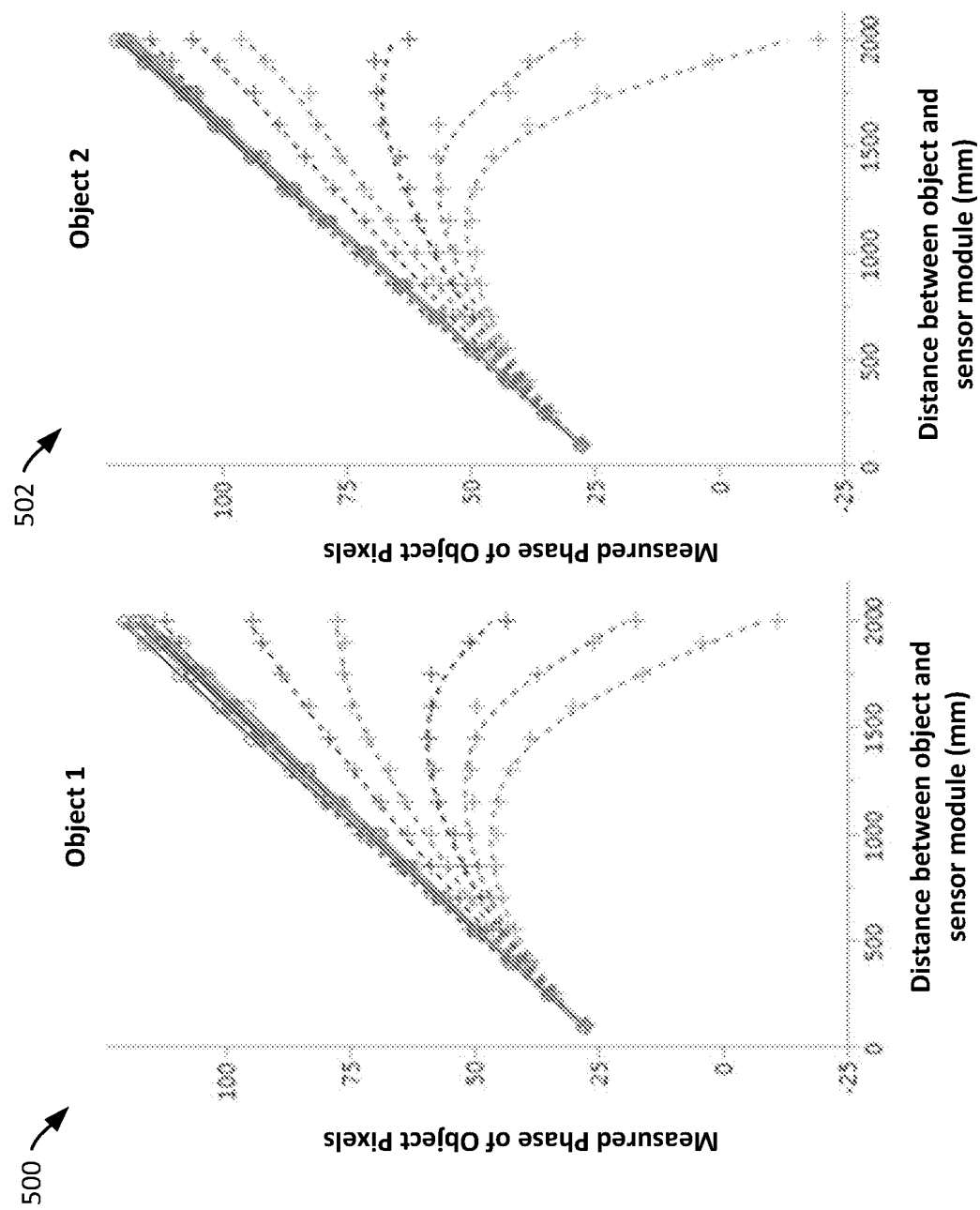
FIG. 5 shows example measurements obtained using a time-of-flight sensor module.

Plots 500 and 502 in FIG. 5 show two example experimental results obtained using the sensor modules described herein. In these experiments, two different objects (e.g., large grey targets) were positioned at varying distances from a sensor module, as indicated by the horizontal axes. The sensor module was then used to determine a phase of measured signals in the presence a variety of different intensity levels of background light (e.g., light generated by broadband halogen lamps, mimicking light from the sun), as indicated by the vertical axes. Each line represents the measured phase with respect to a different intensity level of background light. Further, measurements made using the background light correction techniques described herein are indicated by solid lines with "o" markers), while measurements made without background light correction are indicated by dotted lines with "+" markers.

If the measurements are correct for all distances, the measured phase should vary linearly with the distance (e.g., a straight line in the plots). As shown in plots 500 and 502, the measurements performed without background light correction (indicated by the dotted lines with "+" markers) exhibit significant non-linear behavior, indicating that the measurements are not for all distances. Further, as the intensity of the background light increases, the measurements exhibit greater non-linear behavior, indicating that the measurements are more inaccurate when conducted in the presence of higher intensity background light.

However, the measurement performed with background light correction (indicated by the solids lines with "o" markers) exhibit substantially linear behavior, indicating that the measurements are correct over the range of distances (e.g., between 0 and 2000 mm), regardless of the intensity level of the background light. Accordingly, the sensor module is able to compensate for the negative effects of the background light.

Figure 6:
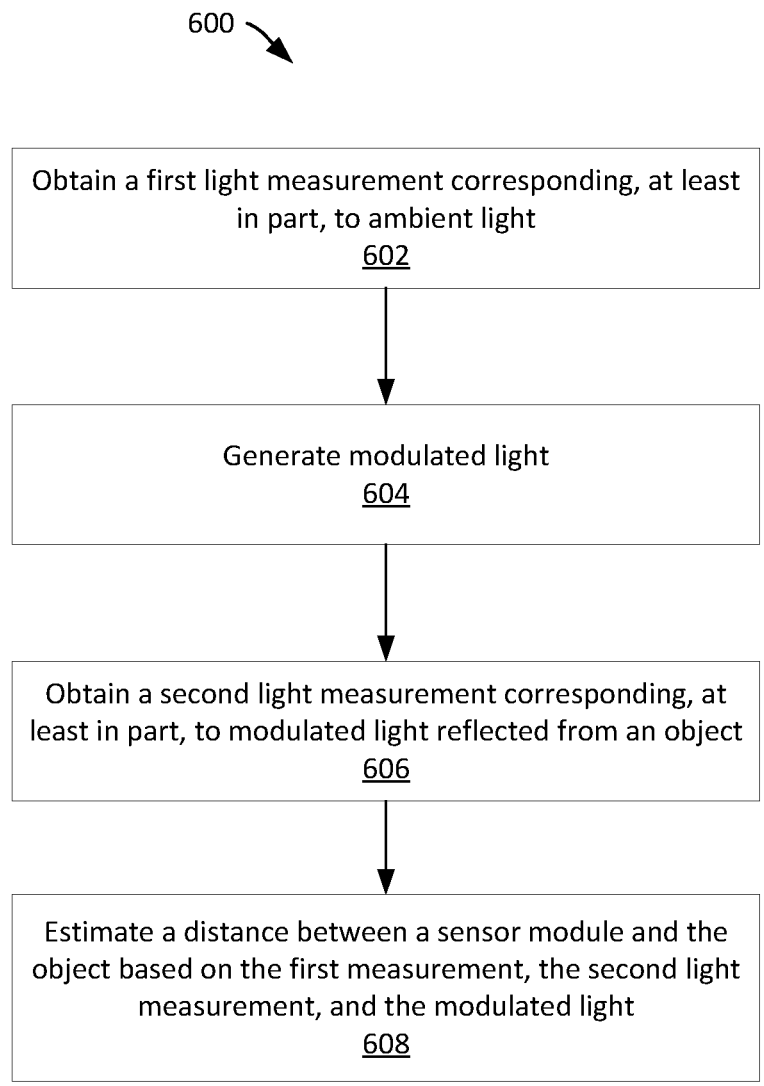
FIG. 6 shows an example process for obtaining measurements using a time-of-flight sensor module.

FIG. 6 illustrates an example process 600 for obtaining measurements using a time-of-flight sensor module. Some or all of the process 600 can be performed, for example, using the senor modules 100 and/or host devices described herein.

In the process 600, a first light measurement is obtained using a photodetector of a sensor module (step 602). The first light measurement corresponds, at least in part, to ambient light in an environment of the sensor module (e.g., background light emitted by one or more background light sources). In some cases, the ambient light includes sunlight. In some cases, the ambient light includes light emitted by one or more artificial light sources in an environment of the sensor module. Example techniques for measuring ambient or background light are show and described, for example, with respect to FIG. 4A.

Modulated light is generated using a light source of the sensor module (step 604). Further, a second light measurement is obtained using the photodetector of the sensor module (step 606). The second light measurement corresponds, at least in part, to modulated light reflected from an object toward the photodetector. Example techniques for generating modulated light and measuring reflected light are show and described, for example, with respect to FIG. 4B.

A distance between the sensor module and the object is estimated based on the first measurement, the second light measurement, and the modulated light (step 608). This can be performed, for example, using an electronic control device of the sensor module. Example techniques for generating modulated light and measuring reflected light are show and described, for example, with respect to FIGS. 4C and 4D.

In some cases, estimating the distance between the sensor module and the object includes determining a first phase vector corresponding to the first light measurement, determining a second phase vector corresponding to the second light measurement, and determining a third phase vector corresponding to the modulated light. Further, the first phase vector can be subtracted from the second phase vector to obtain a fourth phase vector. A difference in phase between the fourth phase vector and the third phase vector can be determined. The distance between the sensor module and the object can be estimated based on the difference in phase between the fourth phase vector and the third phase vector. In some cases, the distance is approximately proportional to the difference in phase between the fourth phase vector and the third phase vector.

In some cases, an intensity of the ambient light is determined based on the first light measurement. Further, a determination can be made that the intensity of the ambient light is greater than a threshold intensity level. Responsive to this determination, a notification can be presented to a user of the sensor module (e.g., indicating that distance estimates conducted in the presence of the ambient light may be inaccurate or unreliable as a result of high intensity background light).

In some cases, an indication of the distance between the sensor module and the object is transmitted to one or more processors of a host device. Further, an operation of host device can be modified in response to the indication of the distance between the sensor module and the object.

EXAMPLE SYSTEMS

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the electronic control devices 106 can be implemented using digital electronic circuitry, or in computer software, firmware, or hardware, or in combinations of one or more of them. As another example, in some implementations, the process 600 can be performed using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The sensor modules described herein can be integrated into host devices such as smartphones, laptops, wearable devices, other computers, robots, and automobiles. The host devices may include processors and other electronic components, and other supplemental modules operable to collect data (e.g., cameras, proximity sensors, etc.). Other supplemental modules may be included such as ambient lighting, display screens, automotive headlamps, and the like. The host devices may further include non-volatile memory where instructions for operating the IC devices, and in some instances the supplemental modules, are stored.

The sensor modules described herein can, in some instances, improve the performance of the host devices. For example, host devices are often used in a variety of different environments, and under a variety of different conditions. Despite these variations, the time-of-flight sensors described herein can obtain measurements that are more accurate and/or reliable in a variety of different conditions (e.g., compared to measurements conducted without a background correction technique). This enables the sensor to be used across a more diverse range of applications, environments, times of day, etc. Further, the host devices can use these measurements to ascertain their surroundings more accurately, and more effectively adapt their operations based on this information.

Figure 7:
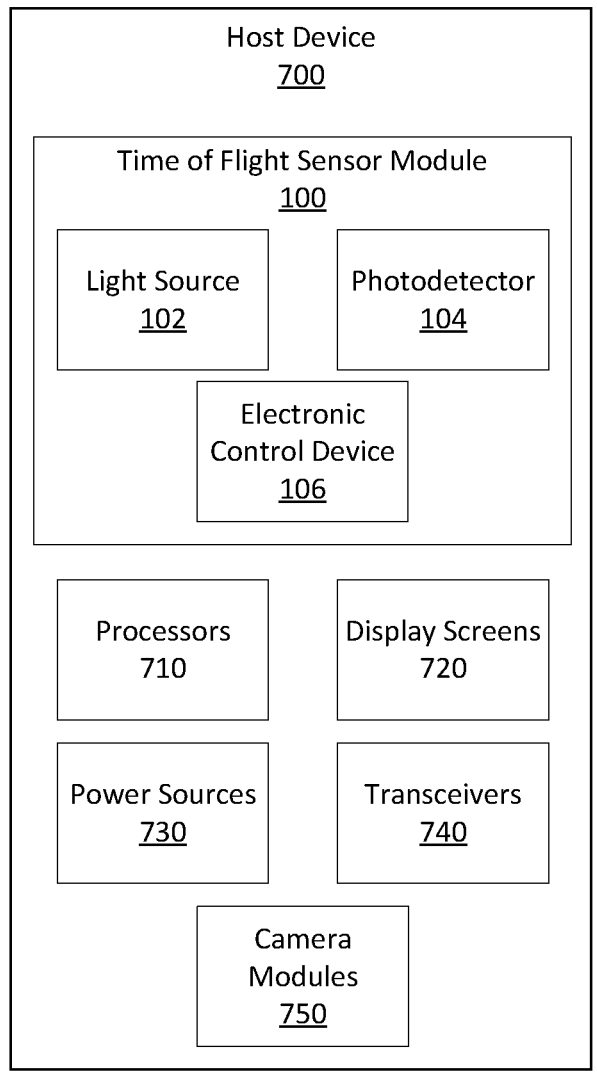
FIG. 7 shows an example host device having a time-of-flight sensor module.

As an example, FIG. 7 shows a host device 700 including a time-of-flight sensor module 100 (including a light source 102, a photodetector 104, and an electronic control device 106). The host device 700 also includes several additional components, including one or more computer processors 710 (e.g., to implement the electronic control device 106 and/or to provide other computation functions), one or more display screens 720, one or more power sources 730 (e.g., batteries, charging circuits, etc.), one or more transceivers 740 (e.g., a wireless radio, such a Wi-Fi radio, cellular radio, Bluetooth radio, etc.), and one or more camera modules 750 (e.g., imaging sensors, such as semiconductor charge-coupled devices [CCD], active pixel sensors in complementary metal-oxide-semiconductors (CMOS), and/or N-type metal-oxide-semiconductors [NMOS]). During operation of the host device 700, the host device 700 can obtain information regarding its surroundings (e.g., information regarding the presence of objects in proximity to the host device 700, and the distance of those objects from the host device 700) using the sensor module 100.

Further, the host device 700 can modify its operations based on the information based on by the sensor module 100. For instance, after determining the presence of an object and/or the distance between the object and the sensor module 100, the host device 700 can adjust a focus of one or more camera modules based on the estimated distance (e.g., to obtain clearer or sharper images of a detected object). As another example, the host device 700 can generate a map or other spatial representation of its environment, including information regarding the location of the object in the environment. As another example, the host device 700 can generate one or more graphical display elements that vary according the surrounding environment (e.g., an "augmented reality" graphical user interface including a video or image of the surrounding environment, and one or graphical overlays identifying objects in the video or image). Further still, the host device 700 can transmit information regarding the objects to one or more other devices (e.g., one or more other host devices), such that other devices also have access to the information.

While this specification contains many details, these should not be construed as limitations on the scope of what may be claimed, but rather as descriptions of features specific to particular examples. Certain features that are described in this specification in the context of separate implementations can also be combined in the same implementation. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

What is claimed is:
1. A method comprising:
obtaining a first light measurement using a photodetector of a sensor module, the first light measurement corresponding, at least in part, to ambient light in an environment of the sensor module;
generating modulated light using light source of the sensor module;
obtaining a second light measurement using the photodetector of the sensor module, the second light measurement corresponding, at least in part, to modulated light reflected from an object toward the photodetector; and
estimating, using an electronic control device, a distance between the sensor module and the object based on the first measurement, the second light measurement, and the modulated light;
wherein estimating the distance between the sensor module and the object comprises:
determining a first phase vector corresponding to the first light measurement,
determining a second phase vector corresponding to the second light measurement,
determining a third phase vector corresponding to the modulated light,
subtracting the first phase vector from the second phase vector to obtain a fourth phase vector, determining a difference in phase between the fourth phase vector and the third phase vector, and estimating the distance between the sensor module and the object based on the difference in phase between the fourth phase vector and the third phase vector, wherein the distance between the sensor module and the object is approximately proportional of the difference in phase between the fourth phase vector and the third phase vector.

2. The method of claim 1, further comprising:

determining, based on the first light measurement, an intensity of the ambient light;

determining that the intensity of the ambient light is greater than a threshold intensity level; and responsive to determining that the intensity of the ambient light is greater than the threshold intensity level, presenting a notification to a user of the sensor module.

3. The method of claim 1, further comprising transmitting an indication of the distance between the sensor module and the object to one or more processors of a host device.

4. The method of claim 3, further comprising modifying an operation of host device based on the indication of the distance between the sensor module and the object.

5. The method of claim 1, wherein the ambient light comprises sunlight.

6. The method of claim 1, wherein the ambient light comprises light emitted by one or more artificial light sources in an environment of the sensor module.

7. A system comprising:

a sensor module comprising a photodetector and a light source; and an electronic control device, wherein the sensor module is operable to:

obtain a first light measurement using the photodetector, the first light measurement corresponding, at least in part, to ambient light in an environment of the sensor module, generate modulated light using the light source, obtain a second light measurement using the photodetector, the second light measurement corresponding, at least in part, to modulated light reflected from an object toward the photodetector, and wherein the electronic control device is operable to:

estimate a distance between the sensor module and the object based on the first measurement, the second light measurement, and the modulated light, wherein estimating the distance between the sensor module and the object comprises:

determining a first phase vector corresponding to the first light measurement, determining a second phase vector corresponding to the second light measurement, determining a third phase vector corresponding to the modulated light, subtracting the first phase vector from the second phase vector to obtain a fourth phase vector, determining a difference in phase between the fourth phase vector and the third phase vector, estimating the distance between the sensor module and the object based on the difference in phase between the fourth phase vector and the third phase vector, wherein the distance between the sensor module and the object is approximately proportional of the difference in phase between the fourth phase vector and the third phase vector.

8. The system of claim 7, wherein the sensor module comprises a time of flight sensor module.

9. The system of claim 7, wherein the light source comprises a laser emitter.

10. The system of claim 7, wherein the photodetector comprises a photodiode.

* * * * *